United States Patent [19]

Smetz

[11] 4,149,369
[45] Apr. 17, 1979

[54] SHORTENING HOOK FOR CHAINS

[76] Inventor: Reinhard G. E. Smetz, Baldingerstrasse 2, D-8860 Nördlingen, Fed. Rep. of Germany

[21] Appl. No.: 815,264

[22] Filed: Jul. 13, 1977

[30] Foreign Application Priority Data

Jul. 20, 1976 [DE] Fed. Rep. of Germany ....... 2633092

[51] Int. Cl.² .............................................. F16G 17/00
[52] U.S. Cl. ...................... 59/93; 24/116 R; 24/236; 294/82 R
[58] Field of Search ............... 59/93, 86; 24/116, 236, 24/241 S, 230.5, 241 SL, 238; 294/82; 403/93

[56] References Cited

U.S. PATENT DOCUMENTS 1,347,725  7/1920  Weiss ...................................... 59/85
3,863,441  2/1975  Kaufmann ............................... 59/93

FOREIGN PATENT DOCUMENTS 1381466  11/1964  France ........................................ 59/93
18347 of 10/1898  United Kingdom ................ 24/241 SL Primary Examiner—C. W. Lanham
Assistant Examiner—Gene P. Crosby
Attorney, Agent, or Firm—Parmelee, Johnson, Bollinger & Bramblett

[57] ABSTRACT

An improved shortening hook for chains with closed elongated links is described. It comprises a slot for receiving a chain link one limb of which is supported by a transverse yoke at the base of the slot. To prevent the chain link from escaping inadvertently from the slot, a locking device fixed to the prong of the hook projects into the mouth part of the slot.

10 Claims, 3 Drawing Figures

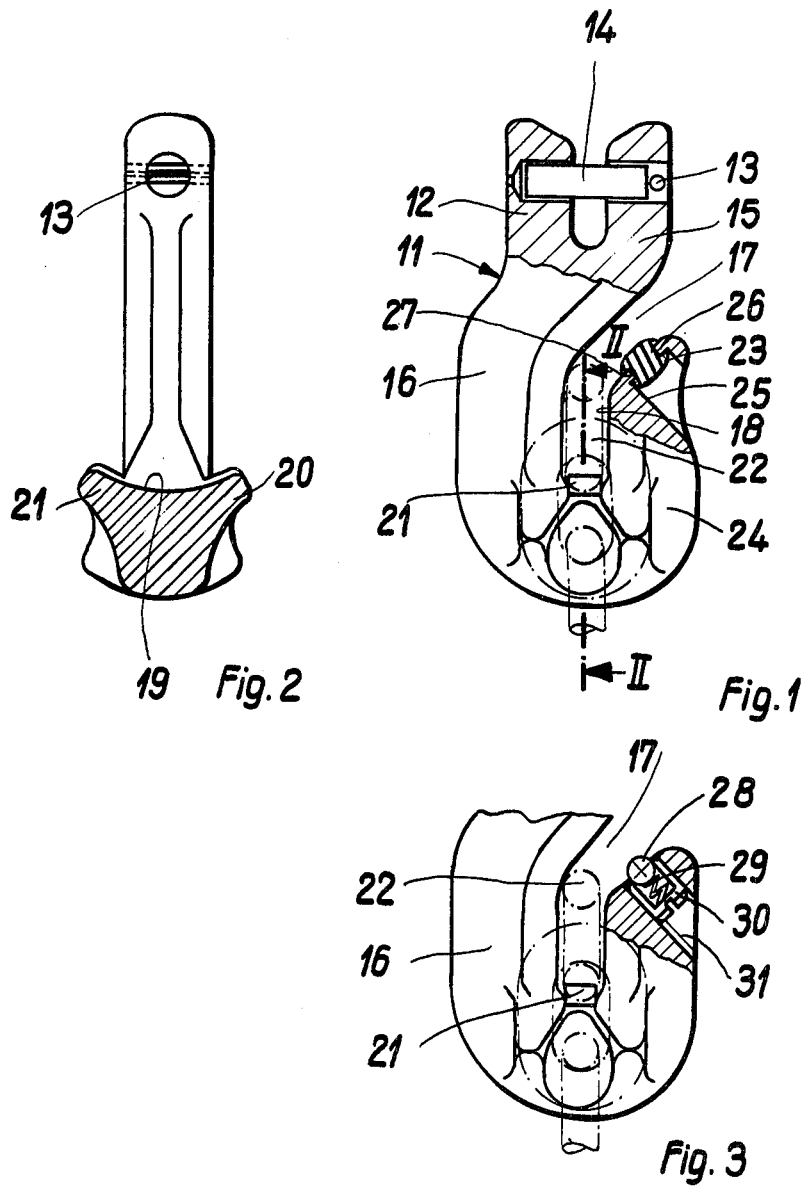

SHORTENING HOOK FOR CHAINS

The invention relates to a shortening hook for chains with closed elongated links, with a slot for receiving the chain link and having essentially parallel internal surfaces for preventing the chain link from tilting; and with a transverse yoke at the base of the slot for supporting a straight part of a limb of a chain link while it is resting in the base of the slot.

Shortening hooks of this kind are used mainly in chain suspension systems which have several chains, such as are used for lifting bulky constructional parts. The load is sometimes lifted and lowered again to the ground several times, with the result that the chains become loose. Under these circumstances it can happen that the chain links retained in the shortening hooks escape inadvertently from the hooks. This is dangerous and must be prevented, if possible without it being necessary to inspect each shortening hook each time, to make sure that the link is secure.

It is known to reduce the likelihood of an inadvertent escape of the chain link from the shortening hook by using an angled slot in the hook, for retaining the chain link. The angled slot consists of a mouth part which forms an angle with the longitudinal axis of the hook and an inner slot part, or guide part, which extends in the direction of the hook axis. Easy escaping of the chain link is prevented by the angled slot and also, if desired, by giving the hook two sideways projecting yokes which engage between the arms of the chain links adjacent the link which is resting in the hook. Such a proposal is described in the specification of U.S. Pat. No. 3,863,441. Nevertheless, under certain circumstances it is still possible for the chain link engaged in the hook to escape inadvertently from the hook when the chain is loosened.

The problem tackled in the present invention is to reduce still further, by suitable means, the likelihood of the link escaping inadvertently from the shortening hook when the chain is loosened, that is to say to improve the safety and security of the engagement of the link in the hook. The problem is solved according to the invention in that a locking device for preventing the chain link from escaping inadvertently from the slot in the hook is fixed to the prong of the hook, near the end of the prong, and projects into the mouth part of the slot.

The solution according to the invention has the advantage that the chain link engaged in the shortening hook cannot of itself escape from its secure position, even when the chain is loose. Inadvertent escaping of the chain link, which can be very dangerous, is therfore reliably prevented. Fixing the locking device to the prong of the hook has the advantage that there are no attachment devices or guiding devices for the locking device which could weaken the load-bearing parts of the hook.

It has been found particularly advantageous to retain the locking device in a bore whose axis extends essentially perpendicular to the longitudinal axis of the mouth part of the slot. This places the locking device in a protected position where it can enjoy a long working life.

The locking device is preferably in the form of a rubber pad. This has the advantage of simplicity and the rubber pad requires little maintenance. In a preferred version of the invention the rubber pad has an annular groove which engages with an internal annular flange, or annular retainer ring, formed in the end of a stepped bore which is nearest to the slot.

The invention will now be described in greater detail on the basis of the examples represented in the drawing, in which:

FIG. 1 is a partly sectioned side view of the shortening hook;

FIG. 2 is a section taken in the plane II—II of FIG. 1; and

FIG. 3 is a side view corresponding to FIG. 1, but showing a second version of the invention.

The shortening hook indicated generally by 11 in FIG. 1 has a shank 12 containing a slot 15 for receiving the end-link (not shown) of a chain. The chain link is retained in place by a cross-pin 14, which is itself retained by a locking pin 13. The hook proper 16 is an extension of the shank 12. The hook has an angled slot 17, 18 consisting of a mouth part 17 and a guide part 18. At the innermost end of the guide part 18 of the slot the hook has a cross-yoke 19 with two lateral ends 20 and 21 projecting sideways out beyong the main body of the hook (compare FIG. 2). The cross-yoke 19 supports a longitudinal arm of a chain link 22 which has been inserted through the mouth part 17 into the guide part 18 of the angled slot 17, 18. Projecting into the mouth part 17 of the slot there is a locking device in the form of a rubber pad 23, for retaining the chain link. The rubber pad 23 is retained in a bore 25 in the hook prong 24 near its outer end. The axis of the bore 25 is substantially perpendicular to the longitudinal axis of the mouth part 17 of the slot. The bore 25 is stepped, forming an annular internal flange or retainer ring 26 which engages in an annular groove 27 of the rubber pad 23, so as to retain the rubber pad reliably in place.

The rubber pad 23, which functions as the locking device, projects inwards into the mouth part 17 of the angled slot 17, 18 far enough so that it is deformed when the chain link 22 is introduced through the mouth part 17 of the slot into its guide part 18. It should be observed that once the chain link 22 is safely in place in the guide part 18 of the slot, the rubber pad 23 is no longer stressed. This has the advantage that the locking device of the hook is stressed only when the chain link is being inserted or removed and consequently wearing out of the rubber pad and fatigue of the rubber are minimal.

In the version shown in FIG. 3 the same reference numerals are used for the same parts. In this version the locking device is not a rubber pad but rather a ball catch with a retainer ball 28 which is urged by a spring 29 towards the interior of the mouth part 17 of the angled slot. The ball 28 and the spring 29 are housed in a retainer pot 30 which is screwed into a threaded bore 31 in the hook prong 24. By screwing the retainer pot 30 into or out of the bore 21 it is possible to adjust the resistance applied by the ball 28 to the introduction and escape of the chain link 22.

The locking device 23 and 28 considerably reinforce the locking effect which is already provided by the angled shape of the slot 17, 18 and by the lateral yoke ends 20, 21. The shortening hook according to the invention provides a reliable retaining effect against inadvertent escape of the chain link from the hook, even when the chain is slack. It has been found particularly advantageous to combine together the two locking devices described above. Furthermore the locking devices described are also suitable for use in other kinds of shortening hook.

I claim:

1. A shortening hook for chains having elongated closed links with a slot for receiving a chain link having essentially parallel internal surfaces for preventing said chain link from tilting, a transverse yoke at the base of said slot for supporting a straight part of a limb of said chain link when it is resting in the base of said slot, a locking device for preventing both limbs of said chain link from escaping inadvertently from said slot, said locking device forming a unit removably mounted in a bore whose longitudinal axis extends essentially perpendicular to the longitudinal axis of the mouth part of said slot and which is provided with retaining means formed by at least one rim fitting into at least one corresponding groove at the periphery of said locking unit.

2. A shortening hook for chains according to claim 1, wherein the mouth part of said hook having said bore for said locking unit forms an angle with said portion of said slot extending parallel to the longitudinal axis of said hook.

3. A shortening hook for chains according to claim 1, wherein said locking unit is formed by a rubber pad having said groove and being annular which engages said rim formed by the end of said bore nearest to said slot.

4. A shortening hook for chains according to claim 3, wherein the mouth part of said hook having said bore for said locking unit forms an angle with said portion of said slot extending parallel to the longitudinal axis of said hook.

5. A shortening hook for chains having elongated closed links with a slot for receiving a chain link and having essentially parallel internal surfaces for preventing the chain link from tilting, a transverse yoke at the base of the slot for supporting a straight part of a limb of said chain link when it is resting in the base of said slot, and a locking unit for preventing said chain link from escaping inadvertently from said slot, said locking unit being fixed to the prong of said hook and projection into the mouth part of said slot, said locking unit including means for adjusting the extent which said locking unit projects into said mouth part of said slot, wherein said locking unit comprises a ball and a spring which are housed in a retainer pot, which is itself screwed into said bore provided with a thread.

6. A shortening hook for chains according to claim 5, wherein the mouth part of said hook having said bore for said locking unit forms an angle with said portion of said slot extending parallel to the longitudinal axis of said hook.

7. A shortening hook for chains having elongated closed links with a slot for receiving a chain link and having essentially parallel internal surfaces for preventing said chain link from tilting, and a transverse yoke at the base of said slot for supporting a straight part of a limb of said chain link when it is resting in said base of said slot, said shortening hook including a locking device for preventing said chain link from inadvertently escaping from said slot, said locking device being retained in a stepped bore defined on the prong of said hook, the longitudinal axis of said bore extending essentially perpendicular to the longitudinal axis of the mouth part of said slot, said locking device projecting into said mouth part of said slot, said locking device including an annular retainer ring formed by the inner end of said stepped bore nearest to said slot and a rubber pad having an annular groove which engages with said annular retainer ring.

8. A shortening hook for chains having elongated closed links with a slot for receiving a chain link and having essentially parallel internal surfaces for preventing said chain link from tilting, and a transverse yoke at the base of said slot for supporting a straight part of a limb of said chain link when it is resting in said base of said slot, said shortening hook including a locking device for preventing said chain link from inadvertently escaping from said slot, said locking device being retained in a threaded bore defined on the prong of said hook, said locking device projecting into the mouth part of said slot, the longitudinal axis of said bore extending essentially perpendicular to the longitudinal axis of said mouth part of said slot, said locking device including a ball which is thrust by a spring towards the interior of said mouth part of said slot, said ball and spring being housed within a retainer pot, said retainer pot being screwable into said threaded bore.

9. In a shortening hook for chains having elongated closed links, said hook having a slot for receiving a chain link and having essentially parallel internal surfaces for preventing said chain link from tilting, and a transverse yoke at the base of said slot for supporting a straight part of a limb of said chain link when it is resting in said base of said slot, the improvement comprising a locking device for preventing said chain link from inadvertently escaping from said slot, said locking device being retained in a stepped bore defined on the prong of said hook, the longitudinal axis of said bore extending essentially perpendicular to the longitudinal axis of the mouth part of said slot, said locking device projecting into said mouth part of said slot, said locking device including an annular retainer ring formed by the inner end of said stepped bore nearest to said slot and a rubber pad having an annular groove which engages with said annular retainer ring.

10. In a shortening hook for chains having elongated closed links, said hook having a slot for receiving a chain link and having essentially parallel internal surfaces for preventing said chain link from tilting, and a transverse yoke at the base of said slot for supporting a straight part of a limb of said chain link when it is resting in said base of said slot, the improvement comprising a locking device for preventing said chain link from inadvertently escaping from said slot, said locking device being retained in a threaded bore defined on the prong of said hook, said locking device projecting into the mouth part of said slot, the longitudinal axis of said bore extending essentially perpendicular to the longitudinal axis of said mouth part of said slot, said locking device including a ball which is thrust by a spring towards the interior of said mouth part of said slot, said ball and spring being housed within a retainer pot, said retainer pot being screwable into said threaded bore.

* * * * *

UNITED STATES PATENT OFFICE
CERTIFICATE OF CORRECTION

Patent No. 4,149,369　　　　　　　　　Dated April 17, 1979

Inventor(s) Reinhard G. E. Smetz

It is certified that error appears in the above-identified patent and that said Letters Patent are hereby corrected as shown below:

Claim 5, Line 9 (Column 3, Line 39): Change "projection" to -- projecting --.

Signed and Sealed this

Tenth Day of July 1979

[SEAL]

Attest:

LUTRELLE F. PARKER
Attesting Officer　　　　Acting Commissioner of Patents and Trademarks